(12) United States Patent
Ames et al.

(10) Patent No.: US 6,884,963 B1
(45) Date of Patent: Apr. 26, 2005

(54) APPARATUS AND METHOD FOR WELDING DUPLEX STAINLESS STEEL

(75) Inventors: Nathan D. Ames, Streetsboro, OH (US); Andrew P. Marshall, University Heights, OH (US); Charles Sapsford, Tallmadge, OH (US); Edwin L. Wolf, Novelty, OH (US)

(73) Assignee: Swagelok Company, Solon, OH (US)

( * ) Notice: Subject to any disclaimer, the term of this patent is extended or adjusted under 35 U.S.C. 154(b) by 141 days.

(21) Appl. No.: 10/069,671
(22) PCT Filed: Jun. 23, 2000
(86) PCT No.: PCT/US00/17414
§ 371 (c)(1), (2), (4) Date: Feb. 22, 2002
(87) PCT Pub. No.: WO01/14094
PCT Pub. Date: Mar. 1, 2001

Related U.S. Application Data
(60) Provisional application No. 60/150,738, filed on Aug. 25, 1999.

(51) Int. Cl.[7] ................................................. B23K 9/00
(52) U.S. Cl. ............................ 219/137 WM; 219/136; 219/137 R
(58) Field of Search ................................ 219/137 WM, 219/136, 137 R, 74, 75

(56) References Cited

U.S. PATENT DOCUMENTS

| | | | | |
|---|---|---|---|---|
| 4,338,142 A | * | 7/1982 | Okuda et al. | 148/26 |
| 4,683,011 A | * | 7/1987 | Weaver et al. | 148/26 |
| 4,952,769 A | * | 8/1990 | Acheson | 219/76.14 |
| 5,711,474 A | * | 1/1998 | Hummel | 228/212 |
| 5,804,792 A | * | 9/1998 | Paskell | 219/137 WM |
| 5,864,111 A | * | 1/1999 | Barefoot | 219/61 |
| 6,129,999 A | * | 10/2000 | Ueda et al. | 428/683 |

OTHER PUBLICATIONS

PCT International Search Report, PCT/US00/17414, Swagelok Company.

* cited by examiner

*Primary Examiner*—M. Alexandra Elve
(74) *Attorney, Agent, or Firm*—Calfee, Halter & Griswold, LLP

(57) ABSTRACT

Arc welding of duplex stainless steel tubing is accomplished using a non-pulsed electric arc and a high refractory weld flux. Weld beads, uniform throughout their lengths, and having a duplex phase structure and desirable profile are produced by single pass orbital welding, even if the wall thickness of the duplex tubing exceeds 2 mm.

26 Claims, 1 Drawing Sheet

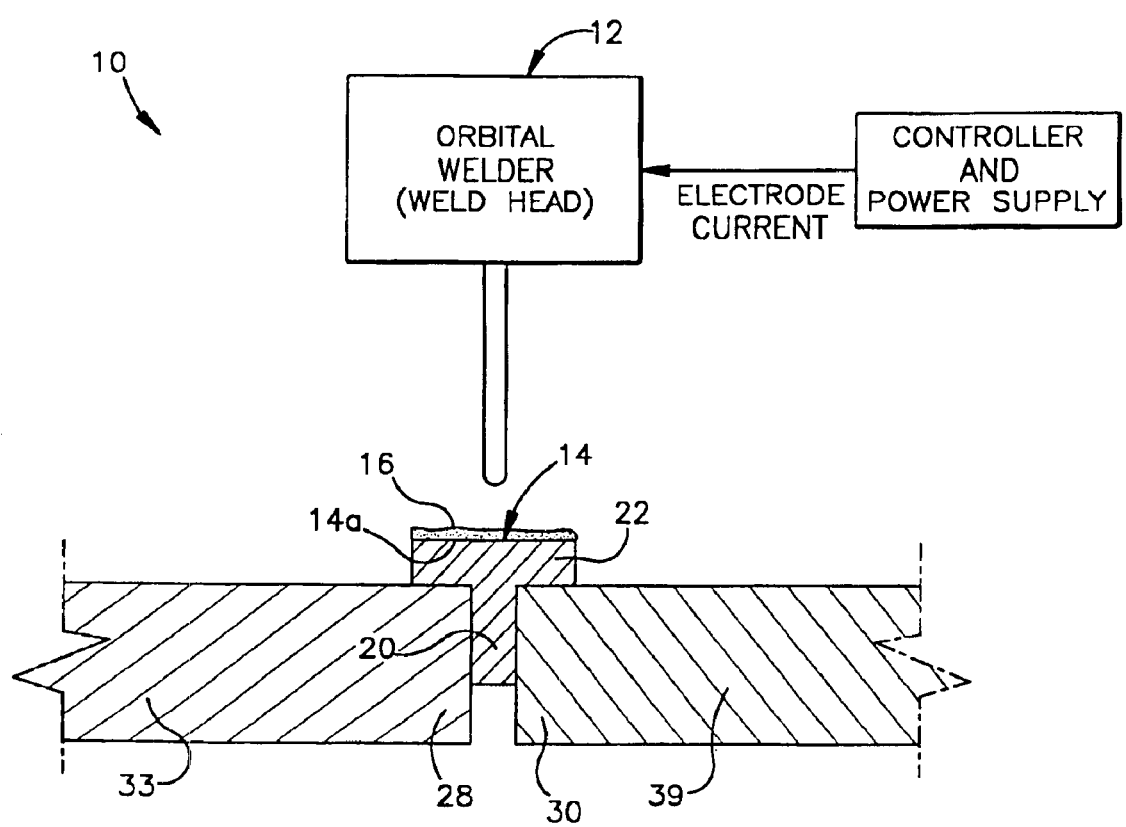

APPARATUS AND METHOD FOR WELDING DUPLEX STAINLESS STEEL

CROSS-REFERENCE TO RELATED APPLICATION

The present application is based on U.S. Provisional Application Ser. No. 60/150,738, filed Aug. 25, 1999, the benefit of which is hereby claimed. The disclosure of this application is also incorporated herein by reference.

TECHNICAL FIELD OF THE INVENTION

The present invention relates to welding processes for duplex stainless steels. More particularly, the invention relates to the use of a flux, and optionally a weld ring, to weld duplex stainless steel using, for example, an orbital welder.

BACKGROUND OF THE INVENTION

Duplex stainless steel is becoming more widely used in applications that require high strength and corrosion resistance. A typical example is deep sea applications in the oil and gas industry. Particularly for high pressure operations, thick walled or heavy duplex tubing may be required. By "thick walled" or "heavy" tubing, which are used interchangeably herein, is meant duplex tubing greater than 2 mm wall thickness. For most applications, duplex tubing is welded either to additional sections of duplex tubing or to fittings, valves and so forth all of which may be made of duplex steel.

Duplex steel is characterized by a phase balance between austenite and ferrite in the steel crystalline structure. In general, duplex stainless steels contain about 30 to 70 vol. % ferrite, more typically about 35 to 60 vol. % ferrite, even more typically about 40 to 45 vol. % ferrite, with the balance being austenite. Maintaining the austenite/ferrite phase balance is very important in that the austenitic phase contributes to the pitting corrosion resistance of the steel while the ferrite phase contributes to greater strength and resistance to chloride stress corrosion cracking.

Welding of duplex steels presents special challenges, since a proper phase balance and nitrogen content must be maintained in the weld metal as well as in the surrounding heat affect zone (HAZ). This is because welding subjects the material forming the weld bead to additional high heat, melting, cooling and solidification. Many factors associated with the welding process can affect the phase balance in the weld metal. These factors include the welding temperature, cooling rate, type of purge gas used during the welding operation and the chemistry of the weld pool. If the final weld solidifies with too much austenite, the strength of the weld can be compromised. If the weld solidifies with too much ferrite, the weld and HAZ may exhibit lower corrosion resistance.

Welding of steel tubing is done both manually and by machine. In both operations, sagging or drop through of the weld pool should be avoided so that the weld bead is uniform in profile along its entire length. In addition, the weld bead should not be too wide in profile, since a weld bead which solidifies too slowly may exhibit improper metallurgy in terms of both chemistry and phase structure. Incomplete penetration through the tube wall should also be avoided.

Machine welding of steel tubing is typically done commercially using orbital welding equipment in which heat for welding is derived from an electric arc generated by a pulsed electric current. The arc emanates from an electrode positioned outside the tubing adjacent the weld junction to be formed, with the electrode being moved by the machine orbitally (circumferentially) around the tubing along its entire circumference. Preferably, orbital welding is accomplished in a single pass (plus an additional 30° to 120° in some instances to complete the weld smoothly), since this approach minimizes problems occurring when a previously formed weld bead is remelted.

Thick walled duplex tubing is particularly difficult to weld, since the factors causing poor weld profile and improper phase balance magnify as tube wall thickness increases. Therefore, it has not been possible to achieve acceptable weld quality when machine welding duplex steel tubing of heavy wall thickness. Although manual welding can achieve acceptable weld quality, a highly skilled welder is required. Moreover, multiple weld passes are also required, which only exacerbates the complexity and expense of the welding process.

It is, therefore, an object of the present invention to provide welding apparatus and methods that significantly improve the weldability of duplex stainless steel by producing acceptable weld profiles and weld beads exhibiting a proper duplex phase balance and nitrogen retention.

It is a further object of the present invention to provide a welding process and apparatus that facilitate machine based welding, especially single pass orbital welding, of duplex stainless steel tubing, especially thick walled duplex stainless steel tubing.

SUMMARY OF THE INVENTION

In accordance with the present invention, it has been found that duplex steel tubing and other parts can be easily joined by machine based arc welding provided that a high-refractory flux is present in the HAZ (heat affected zone) and further that the electric arc generated for welding is non-pulsed. In particular, it has been found that the weld bead produced when welding duplex steel parts together will reliably and consistently achieve the desired duplex phase balance, nitrogen levels and bead profile if a high-refractory flux is present in the HAZ, provided that the arc supplying the weld heat is generated by a non-pulsed electric current.

Accordingly, the present invention in its broader aspects provides a new process for welding duplex steel parts in which formation of a weld bead having a duplex stainless steel phase structure is facilitated by carrying out the welding operation in the presence of a high refractory flux. In addition, the present invention also provides a new process for arc welding duplex steel tubing in which a weld bead having a duplex stainless steel phase structure, a desired nitrogen level and a uniform profile is achieved by carrying out welding in the presence of a high refractory flux with the heat for welding being derived from an arc generated by a non-pulsed electric current.

BRIEF DESCRIPTION OF THE DRAWING

The invention may take physical form in certain parts and arrangements of parts, preferred embodiments and a method of which will be described in detail in this specification and illustrated in the accompanying drawing which form a part hereof, and wherein is illustrated an apparatus for welding duplex steel thick walled tubing.

DETAILED DESCRIPTION OF THE PREFERRED EMBODIMENTS

The present invention can be used for welding a wide variety of parts together that are made of duplex stainless steel, especially but not necessarily thick walled or heavy duplex tubing and tube ends. In particular, the present invention is directed to welding together two or more parts, at least one of which is formed from a duplex steel, and further in which the weld bead formed by the welding operation also has a duplex structure.

As mentioned above, duplex stainless steels contain about 30 to 70 vol. % ferrite, more typically about 35 to 60 vol. % ferrite, even more typically about 40 to 45 vol. % ferrite, with the balance being austenite. The weld beads produced by the inventive process also have a duplex stainless steel phase structure, meaning they also contain these amounts of austenite and ferrite, since this balance of phases is needed to achieve the high strength and corrosion resistance characteristic of duplex steels.

In accordance with the present invention, it has been found that a weld bead having the above desired phase balance and nitrogen levels, as well as an appropriate profile, can be formed when welding duplex steel, provided that a high-refractory flux is present in the HAZ and the electric arc used for supplying the welding heat is non-pulsed.

Weld fluxes are well known products of commerce extensively used in the welding industry. Basically, they serve as surface active agents causing the molten weld pool to flow in a desired manner, i.e. to amalgamate or consolidate along the surface being heated into a compact mass. The effectiveness of a weld flux in promoting consolidation of a weld pool is measured in terms of penetration characteristic of the weld, which is the ratio of the weld depth to its width at its widest point. In accordance with the present invention, welds can be produced with penetration coefficients of 0.33 or greater, preferably 0.5 or greater, more preferably 1.0 or greater.

Many different materials have been used for weld fluxes. Most typical are chlorides and fluorides such as magnesium chloride, ferric chloride, tin chloride and various sulfur containing compounds. In accordance with the present invention, we have discovered that these typical weld fluxes are ineffective in achieving a duplex weld bead with the desired phase balance and profile. In particular, we have determined that such fluxes contaminate the weld pool with extraneous materials such as chloride, fluoride and/or sulfur atoms, thereby adversely affecting the phase balance and chemistry of the weld bead ultimately produced. In the present invention, therefore, a different type of weld flux is used, referred to herein as "high refractory" fluxes.

A high refractory flux in accordance with the present invention is any material which will impart surface active properties to the weld pool which it contacts in the manner of conventional welding fluxes, but which also does not contaminate the molten weld pool with extraneous atoms as a result of the welding operation. Examples of materials which are useful for this purpose are the refractory oxides such as silica, titania, magnesia, chromia, TiO, and the like. An especially preferred weld flux is composed of a mixture of $Cr_2O_3$, $SiO_2$ and an oxide of titanium, particularly a mixture of about 30 to 70 wt. % of a titanium oxide (TiO and/or $TiO_2$), 20 to 76 wt. % $Cr_2O_3$ and 5 to 27 wt. % $SiO_2$, as described in U.S. Pat. No. 5,804,792, the disclosure of which is incorporated herein by reference. A flux comprising about 50% oxide of titanium, about 40% $Cr_2O_3$ and about 10% $SiO_2$ is especially preferred. Generally, such fluxes are supplied in admixture with a liquid carrier such as water or an organic material such as acetone or methyl ethyl ketone. An exemplary flux of this type is LFX-SS7 flux available from Liburdi Dimetrics Company of Dundas, Ontario, Canada.

These fluxes are used in accordance with the present invention in the same way as conventional welding fluxes. Thus they may be applied in the same amounts, to the same locations, and at the same time, as conventional fluxes. Where a weld ring is used, in accordance with a preferred embodiment of the invention as describe below, the weld flux may be applied to the weld ring only, before or after the weld ring is joined to the tubes being welded, or it may be applied the tubes themselves, or to both the weld ring and the tubes.

Once the weld flux is applied, the duplex parts to be joined are welded in a conventional manner. Where welding is accomplished by arc welding, it is preferable in accordance with the present invention to use non-pulsed welding—i.e., arc welding in which the electric current generating the arc is non-pulsed, preferably continuous. In a typical orbital welding operation, pulsed electrode currents are used because they are easier to regulate and to use to control heat at the weld zone. However, we have found that weld beads produced with pulsed arcs are unacceptably porous and non-uniform if a high refractory weld flux, as described above, is present during welding. Although not wishing to be bound to any theory, we believe unacceptable welds are produced when pulsed arcs are used together with high refractory fluxes because of excessive turbulence created in the weld pool. Non-pulsed arcs smooth out the rate heat is applied and thereby reduce or eliminate excessive heat generation and attendant turbulence during peaks in the electrical cycle.

In standard arc welding, current pulsing occurs at 2 to 20 Hertz, typically, with amplitudes generally varying between 100% and 30% of peak. "Non-pulsed" as used herein means that the period of the pulse is lengthened and/or the variation between maximum and minimum amplitude is reduced so that violent turbulence and it attendant adverse effect on weld quality is substantially eliminated. Preferably, direct (continuous) current is used, as this completely eliminates the adverse effects of pulsing. Using non-pulsed arcs in accordance with the present invention has also be found to reduce the total amount of electrical power required for welding.

A particular advantage of the present invention is that high quality welds having the desired austenite/ferrite balance, nitrogen levels and bead profile can be produced in a single electrode pass, even if the wall thickness of the tubing being welded exceeds 2 mm. Orbital welding of duplex steel tubing using conventional technology is difficult at best and impossible, as a practical matter, when the wall thickness of the tubing exceeds 2 mm. Welding duplex tubing of this thickness manually is possible, but very difficult, and in any event multiple passes are required. In accordance with the present invention, however, tubing of this thickness can be readily welded together with conventional orbital welders even when the welders are operated in a single pass mode. In this connection, it should be understood that single pass operation as contemplated herein includes extending the pass of the electrode by an additional 30, 45, 90, 120 or even 180 degrees beyond a single complete revolution in order to smooth out completion of the weld. Good results, however, can still be accomplished with a single pass of 360 degrees.

In accordance with another embodiment of the invention, the weld pool is formed using additional alloy elements supplied by a weld filler material. Using weld fillers to supply additional alloying elements to a weld is a common welding practice. Since the metallurgy of a weld can often be different from that of the underlying base metal, additional alloying elements supplied by a weld filler can be used to alter the chemistry of the weld so as to achieve a more desirable chemistry and metallurgy. This effect can be used in welding duplex steels in accordance with the present invention to tailor the austenite/ferrite balance of the weld bead produced closer to a desired value.

In this connection, welds produced form duplex steels tend to have a lower proportion of austenite than the base metals from which they are melted. Therefore, this effect can be offset, and the desired phase balance maintained, at least approximately, by using a weld filler whose alloying elements tend to promote austenite formation. Nickel helps stabilize or enhance austenite formation during solidification, while chromium fosters ferrite formation. Therefore, using a weld filler that is over alloyed with nickel compared to the base metal being welded is a desirable approach in accordance with the present invention. For example, a weld filler made of 25.10.4.L filler material available from Sandvik Corporation can be used advantageously for welding 2507 duplex stainless steel also available from Sandvik.

Weld filler materials in accordance with this aspect of the invention can be supplied in any conventional manner. For example, they can be supplied in the form of wire, for use in manual as well as machine based welding, or they can be supplied in the form of weld rings for insertion between and attachment to the ends of the tubes being welded. Preferably, the weld filler is supplied in the form of a weld ring T-shaped in profile since this allows the tube ends to be physically secured together before welding. Also, if desired, the high refractory flux to be used in the inventive process can be applied to the weld ring separately from the tube ends to be welded before or after the weld ring is attached to the tubing to be welded. Indeed, the ingredients of the high refractory flux can even be incorporated into the weld ring when it is made, if desired.

Orbital welding can be carried out using an open system, that is apparatus in which the gap between the weld electrode and tubing being welded is open to the atmosphere, or a closed system in which this gap is enclosed. In either case, it is customary to flush the gap with a shielding gas for substantially eliminating oxygen from the vicinity of the weld and for carrying off any gases produced by the welding operation.

A variety of different gases have been used as shielding gases in conventional welding processes. Examples are the noble gases, especially argon, nitrogen and other gases. Nitrogen when used as a shielding gas in concentrations as low as 2% is known to enhance austenite formation in many different steels and so is a preferred choice in many applications. Hydrogen has also been used. In accordance with the present invention, however, it has been found that nitrogen and hydrogen, in concentrations as low as 2%, cause an "explosion" of the weld pool created in the inventive process when a high refractory flux is present. Accordingly, hydrogen, nitrogen and all other gases having a similar effect are preferably avoided in carrying out the present invention. Thus, the shield gas used in this embodiment of the invention can include inert gases such as the noble gases (helium, argon, neon and xenon) as well as any other gas which does not react with the weld pool or the high refractory flux under the conditions encountered during welding.

The present invention will now be exemplified by a particular embodiment which is illustrated in the drawing:

Apparatus 10 for welding together tube ends 28 and 30 of duplex steel tubes 33 and 39 includes in a preferred embodiment an orbital welder device 12, a weld ring 14 and a flux material 16. The orbital welder may be, for example, an orbital welding system and power supply such as model M-100 available from Swagelok Company of Solon, Ohio. Other welding techniques well known to those of ordinary skill in the art can be used however, including but not limited to manual welding systems. In the exemplary embodiment, duplex steel tubes 33 and 39 are formed from SAF 2507 steel available from Sandvik Corporation of Sandviken, Sweden.

A weld filler material, such as for example, Alloy 25.10.4.L also available from Sandvik, is formed into a consumable insert or weld ring 14. Weld ring 14 is completely consumed in the weld puddle during the welding operation. A significant characteristic of Alloy 25.10.4.L is that it is over alloyed with nickel compared to the base metal being welded. The additional nickel helps stabilize or enhance the austenite formation in the weld during solidification.

Alloy 25.10.4.L is commercially available in wire form from Sandvik Corporation. In accordance with one aspect of the invention, the filler wire is formed into a weld ring having a radial inner ring 20 and a circumferential axially extending ring 22 integral therewith. The weld ring 14 is appropriately dimensioned to slip onto each end of the tube ends being welded together. The weld ring 14 shape also aids in joint alignment which is particularly useful with orbital welding apparatus. Weld ring 14 can be formed by any convenient process such as by sintering, stamping and so forth.

Flux 16 is LFX-SS7 flux available from Liburdi Dimetrics. Other fluxes may be used as mentioned above. Preferably, flux 16 is applied to an outer surface 14a of the weld ring and on adjacent tube surfaces. Surface application facilitates the penetration enhancing characteristic of the flux. The flux 16 is typically available in powder form, but in this case is mixed with a liquid carrier to form a paste that is manually brushed on weld ring 14. The liquid carrier evaporates and the flux remains loosely adhered to the weld ring 14. The flux is preferably entirely consumed during the welding operation, however, flux residue can be easily cleaned from the final weldment as required. Preferably, the flux is kept near the outer surface of the weld ring 14, as shown in the figure.

Flux 16 improves heat penetration in the weld, thus reducing the weld width which reduces the potential for sagging and other weld profile problems that commonly occur during attempts to do a single pass welding operation with thick walled components. By more efficiently directing the heat inward to reduce weld pool spread, the welding operation uses lower currents for full penetration. Reduced current allows for welding with smaller lower power weld heads and power supplies and also further aids in maintaining austenite in the weld.

In operation, the tube ends 28 and 30 of tube sections 33 and 39 are abutted together with weld ring 14 therebetween. Orbital welder 12 is used to perform a single pass welding operation using argon gas as the shield gas. For a typical duplex tube having a wall thickness of 0.095 inch and a tube diameter of 0.5 inch, acceptable welds are achieved using a welding current/voltage of 50 amps and 9 Volts at an electrode travel speed of 2.1 inches per minute. The weld bead produced in this manner has an austenite/ferrite ratio of 58/42 and a uniform profile along its entire width with a penetration characteristic (ratio of weld depth to maximum weld width) of 0.5.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof

We claim:

1. An orbital welding process for joining adjacent ends of two heavy wall duplex stainless steel tubes comprising
   (a) applying a high refractory flux to the heat affect zone formed by the adjacent tube ends to be welded, and
   (b) arc welding the adjacent tube ends together in a single orbital pass using a non-pulsed arc.

2. The process of claim 1, wherein the flux includes at least one of silica, titania, magnesia, chromia and a titanium oxide.

3. The process of claim 2, wherein the refractory flux comprises a mixture of $Cr_2O_3$, $SiO_2$ and an oxide of titanium.

4. The process of claim 3, wherein the refractory flux comprises a mixture of about 30 to 70 wt. % of a titanium dioxide, about 20 to 76 wt. % $Cr_2O_3$, and about 5 to 27 wt. % $SiO_2$.

5. The process of claim 4, wherein the wall thickness of the tubing being welded is greater than 2 mm.

6. The process of claim 2, wherein the wall thickness of the tubing being welded is greater than 2 mm.

7. The process of claim 1, wherein the wall thickness of the tubing being welded is greater than 2 mm.

8. The process of claim 1, wherein a weld filler made from a steel containing more austenite than the duplex steel tubes being welded together is placed between the adjacent tube ends to be welded.

9. The process of claim 8, wherein the weld filler contains more nickel than the duplex steel forming the tubes being welded together.

10. The process of claim 8, wherein welding is accomplished by an orbital welding machine.

11. The process of claim 4, wherein welding is accomplished by an orbital welding machine.

12. The process of claim 1, wherein welding is accomplished by an orbital welding machine.

13. An orbital welding process for joining adjacent ends of two duplex stainless steel tubes comprising
   (a) applying a high refractory flux to the heat affect zone formed by the adjacent tube ends to be welded, and
   (b) arc welding the adjacent tube ends together in a single orbital pass using a non-pulsed electrical arc.

14. The process of claim 13, wherein welding is accomplished by an orbital welding machine.

15. The process of claim 14, wherein the flux includes at least one of silica, titania, magnesia, chromia and a titanium oxide.

16. The process of claim 15, wherein the refractory flux comprises a mixture of $Cr_2O_3$, $SiO_2$ and an oxide of titanium.

17. The process of claim 16, wherein the refractory flux comprises a mixture of about 30 to 70 wt. % of a titanium dioxide, about 20 to 76 wt. % $Cr_2O_3$, and about 5 to 27 wt. % $SiO_2$.

18. The process of claim 14, wherein a weld filler made from a steel containing more austenite than the duplex steel tubes being welded together is placed between the adjacent tube ends to be welded.

19. The process of claim 18, wherein the weld filler contains more nickel than the duplex steel forming the tubes being welded together.

20. The process of claim 14, wherein the orbital welding process produces a weld bead having a penetration characteristic of 0.33 or greater.

21. The process of claim 14, wherein orbital welding is carried out in an enclosed system so as to shield the gap between the electrode producing the arc and the tubing being welded from atmospheric oxygen.

22. The process of claim 21, wherein the gap is flushed with a shield gas non-reactive with the weld pool and high refractory flux.

23. The process of claim 22, wherein the shield gas is helium, argon, neon, xenon or mixtures thereof.

24. The process of claim 14, wherein a weld ring formed from a weld filler material is placed between tube ends to be welded.

25. The process of claim 24, wherein the weld ring is T-shaped in cross section so that the ring can be slipped onto a tube end.

26. The process of claim 25, wherein the flux is applied to an outer surface of the weld ring.

* * * * *